Figure 10:
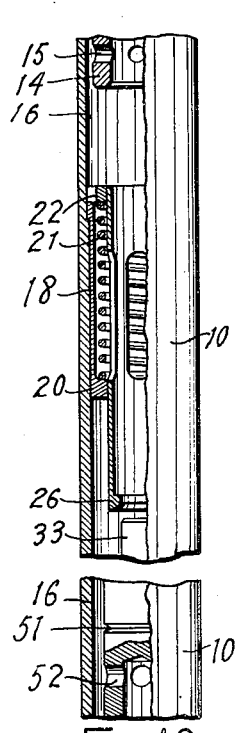

May 16, 1950  R. BASSINGER  2,507,585
PERCUSSION TOOL FOR WELLS
Filed July 26, 1946  3 Sheets-Sheet 1
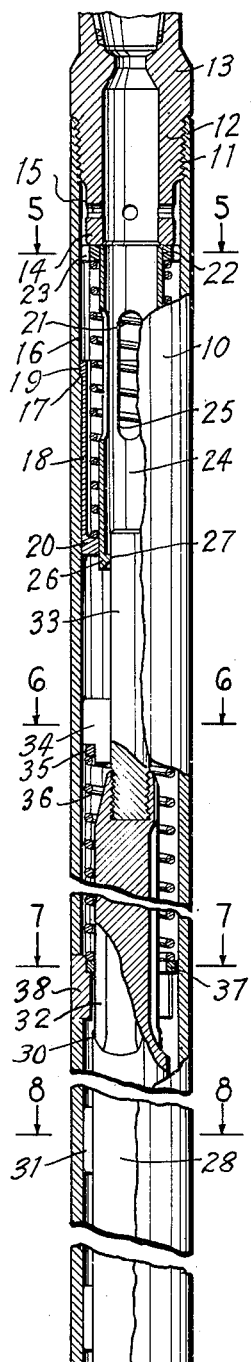
Fig 1
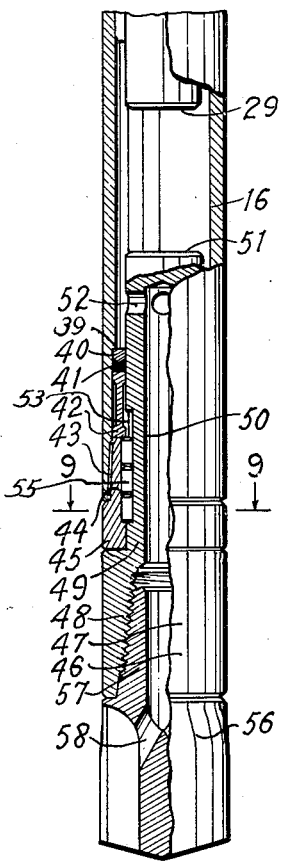
Fig 2
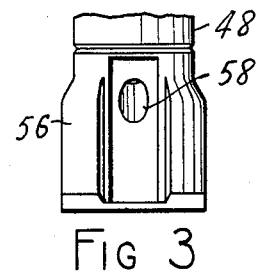
Fig 3
Fig 4
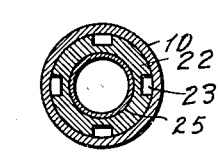
Fig 5
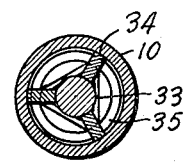
Fig 6
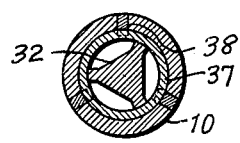
Fig 7
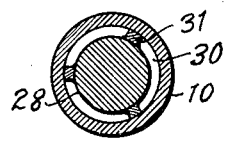
Fig 8
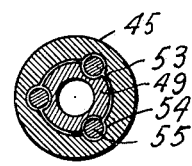
Fig 9
ROSS BASSINGER
INVENTOR
BY *Ashley & Ashley*
ATTORNEYS May 16, 1950  R. BASSINGER  2,507,585
PERCUSSION TOOL FOR WELLS
Filed July 26, 1946  3 Sheets-Sheet 2

ROSS BASSINGER
INVENTOR

BY Ashley & Ashley

ATTORNEYS

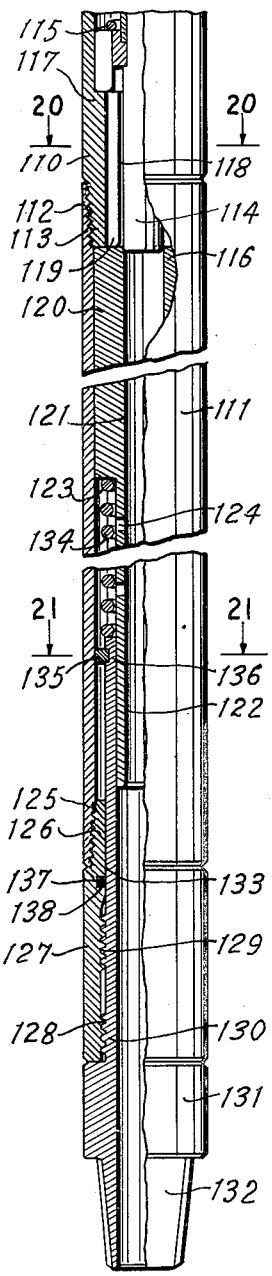
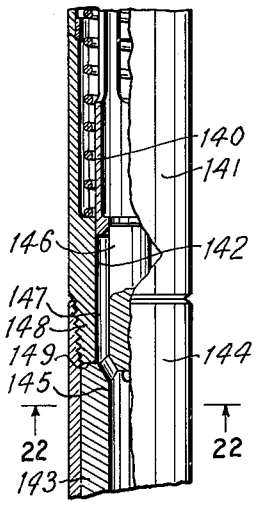
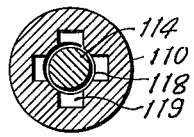
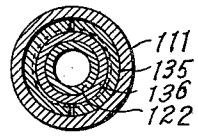
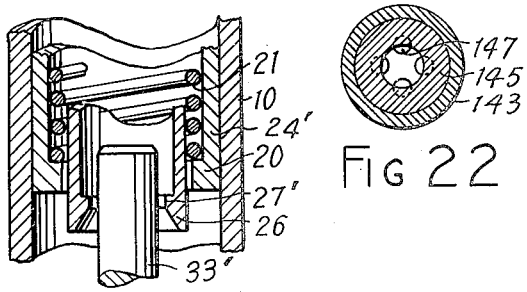

Patented May 16, 1950

2,507,585

UNITED STATES PATENT OFFICE 2,507,585

PERCUSSION TOOL FOR WELLS

Ross Bassinger, Houston, Tex.

Application July 26, 1946, Serial No. 686,497

7 Claims. (Cl. 255—27)

This invention relates to new and useful improvements in percussion tools for wells.

It has been a wide-spread occurrence in the drilling industry, that in drilling wells in certain localities or fields, very hard and rocky formations are sometimes encountered which are very difficult to drill, resulting in uncommonly high drilling expenses; and at the same time, very slow progress in drilling operations. The usual rock-type bits have not proved effective on these formations, as little as one foot of hole drilled before it is necessary to pull the tubing and replace the bit, being a fairly common occurrence. Obviously, such conditions greatly delay the completion of a well with the corresponding increase in expenses, as well as creating highly undesirable collateral conditions which are not favorable to the driller.

Heretofore, various percussion type bits have been developed and tried in drilling operations. At the present time, none of these bits have proved successful or answered the need for a drilling assembly capable of efficient operation under the unfavorable conditions usually encountered, or even under favorable conditions. In some instances, attempts have been made to use a cable tool type bit, but necessarily, such operations were not satisfactory after a certain depth of hole had been obtained.

It is therefore, one object of this invention to provide an improved percussion tool adaptable for use with a drill bit, which is effective and operative under normal conditions within a well bore, to deliver a series of hard blows to a drill bit, or to other suitable tools and connections within a drill string.

It is an important object of the invention to provide an improved percussion tool for use in wells, which is responsive to flow of the drilling fluid through a well conductor to deliver intermittent blows of considerable magnitude and force to a drill bit, or other connection in the drilling string.

A further object of the invention is to provide an improved percussion tool having a hammer which is given momentum by the flow of the drilling fluid and with which blows of considerable intensity and magnitude may be delivered to a suitable connection in a drilling string.

It is a particular object of the invention to provide an improved percussion tool for wells which may be utilized as a jar to deliver a series of blows to a tubing connection, or a fishing tool, or any other suitable element in the drilling string; and which may be rendered inoperative or operative at will without the removal of the drilling string from the well bore being necessitated.

Yet another object of the invention is to provide an improved percussion tool for use in wells, said tool being responsive to the flow of the drilling fluid to deliver a series of blows of considerable magnitude and intensity; and being combined with a cable tool-type bit, whereby a well bore of uniform diameter may be drilled.

Still another object of the invention is to provide an improved percussion tool for use in wells wherein the upper end of a hammer is adapted to be acted upon by the flow and pressure of the drilling fluid to impart a downward impetus to the hammer, and wherein means are provided co-acting with the upper end of the hammer to react also to the drilling fluid and move downwardly as does the hammer, said latter means being stopped and returned to its upward position before the hammer has completed its downward travel under the momentum imparted thereto, so as to receive the upper end of the hammer upon the return of the latter to its upward position and to commence a subsequent downward travel of said hammer, whereby intermittent blows of considerable intensity are delivered by the hammer to a drill bit or other suitable means.

Yet another object of the invention is to provide an improved percussion tool for use in wells wherein the frequency and magnitude or intensity of the blows delivered by the tool may be controlled by the operator.

A construction designed to carry out the invention will be hereinafter described together with other features of the invention.

Figure 15:
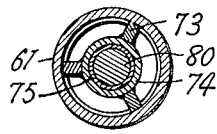
Figure 16:
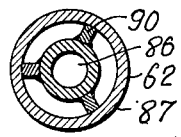
Figure 17:
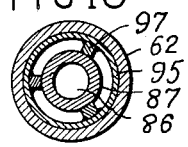
Figure 11:
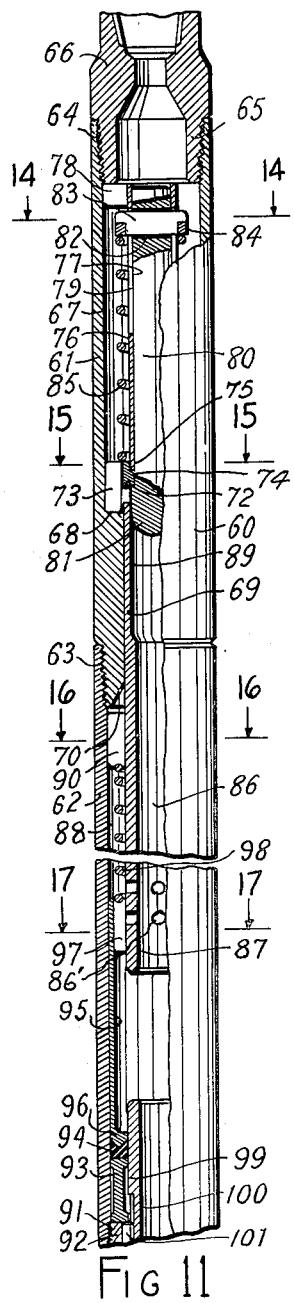
Figure 12:
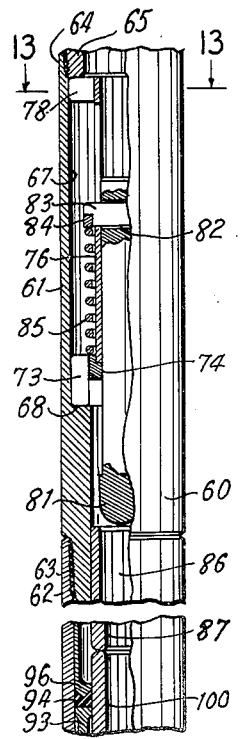
Figure 13:
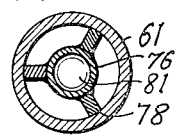
Figure 14:
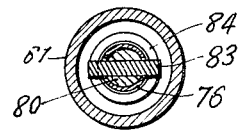

The invention will be more readily understood from a reading of the following specification and by reference to the accompanying drawings, wherein an example of the invention is shown, and wherein:

Fig. 1 is a longitudinal view, partly in elevation and partly in section, of a percussion tool constructed in accordance with this invention, and showing the hammer in a raised position, Fig. 2 is a continuation of Fig. 1, showing the lower end of the tool, Fig. 3 is a view in elevation of the drill bit, taken at right angles to Fig. 2, Fig. 4 is a bottom view of the drill bit, Fig. 5 is a horizontal, cross-sectional view taken on the line 5—5 of Fig. 1, Fig. 6 is a horizontal, cross-sectional view taken on the line 6—6 of Fig. 1, Fig. 7 is a horizontal, cross-sectional view taken on the line 7—7 of Fig. 1, Fig. 8 is a horizontal, cross-sectional view taken on the line 8—8 of Fig. 1, Fig. 9 is a horizontal, cross-sectional view taken on the line 9—9 of Fig. 2, Fig. 10 is a longitudinal view of the upper end of the tool, partly in elevation and partly in section, and showing the hammer and control sleeve in a lowered position, Fig. 11 is a longitudinal view, partly in elevation and partly in section, and showing a modified form of the tool, Fig. 12 is a view similar to Fig. 11 showing the elements of the tool in a lowered position, Fig. 13 is a horizontal, cross-sectional view taken on the line 13—13 of Fig. 12, Fig. 14 is a horizontal, cross-sectional view taken on the line 14—14 of Fig. 11, Fig. 15 is a horizontal, cross-sectional view taken on the line 15—15 of Fig. 11, Fig. 16 is a horizontal, cross-sectional view taken on the line 16—16 of Fig. 11, Fig. 17 is a horizontal, cross-sectional view taken on the line 17—17 of Fig. 11, Fig. 18 is a longitudinal view, partly in elevation and partly in section, and showing a jar made in accordance with the principles of this invention, Fig. 19 is a longitudinal view, partly in elevation and partly in section, and showing a modification of the jar shown in Fig. 18, Fig. 20 is a horizontal, cross-sectional view taken on the line 20—20 of Fig. 18, Fig. 21 is a horizontal, cross-sectional view taken on the line 21—21 of Fig. 18, Fig. 22 is a horizontal, cross-sectional view taken on the line 22—22 of Fig. 19, and Fig. 23 is a vertical sectional view of a portion of the tool showing a modification of the piston and control sleeve.

In the drawings, the numeral 10 designates an elongate cylindrical housing or conductor adapted to be lowered in a well bore, and within which a major portion of the elements of this invention are housed. The upper end of the conductor 10 carries internal screw-threads 11 which engage the screw-threaded pin 12 of a suitable coupling 13 which is carried by a tubing or drilling string and by which the conductor is suspended in a well bore. The extreme lower end of the pin 12 is reduced in diameter to form a depending skirt 14. Radial ports 15 extend outwardly through the walls of the skirt 14 to provide circulation of the drilling fluid between the skirt and the inner walls of the conductor 10, and to permit the drilling fluid to flow therebelow.

The conductor 10 is provided with a longitudinal bore 16, which is reduced slightly in diameter at a point spaced below the upper end of the conductor so as to form an internal annular shoulder 17. A cylindrical sleeve 18 has a snug fit within the bore of the conductor and is provided at its upper end with a laterally-extending external shoulder 19 which engages the shoulder 17 carried by the bore 16, whereby the sleeve is supported within the conductor. An internal, annular flange 20 is formed upon the lower end of the sleeve 18 and a coiled spring 21 is supported upon said flange. A ring 22 is disposed above the upper end of the spring 21 and urged into engagement with the lower edge of the skirt 14 by the compressive force exerted by the spring. The ring 22 carries a plurality of notches 23 about its outer periphery, and an elongate, tubular control sleeve 24 depends from the center portion of the ring.

The ring 22 has a sliding fit within the bore 16 whereby the ring and the sleeve 24 are free to move upwardly and downwardly with respect to the conductor 10, the upward movement of the control sleeve being limited by engagement of the ring 22 with the lower edge of the skirt 14, and downward movement of the sleeve being limited by engagement of the ring with the upper end of the sleeve 18.

A plurality of elongate slots 25 are provided in the side walls of the sleeve 24 to permit circulation of the drilling fluid therethrough. The control sleeve is provided at its lower end with an internal, annular, beveled flange or annulus 26.

An elongate, cylindrical hammer 28 is positioned within the conductor 10 below the control sleeve 24, and being of considerable length and diameter, is very heavy. Obviously, the hammer may be hexagonal or square, or have any other suitable cross-sectional configuration. The lower end of the hammer is positioned above the lower end of the conductor and is cut at right angles to the longitudinal axis of the hammer to form a flat head or striking face 29, the edge of which is bevelled, as is customary in such hammers.

The outside diameter of the hammer is somewhat less than the inside diameter of the conductor 10, so that an annular space 30 is provided therebetween. A plurality of elongate fins or shoes 31 are formed at intervals upon the surface of the hammer, and serve to center the hammer within the bore of the conductor, as is shown in Fig. 8 of the drawings. The upper portion of the hammer is provided with longitudinal flutes 32 for allowing circulation of the drilling fluid, and an elongate reduced cylindrical piston 33 extends axially of the extreme upper end of the hammer. In the position shown in Fig. 1 of the drawings, the upper end of the piston 33 engages within the annulus 26 of the control sleeve 24.

A plurality of laterally-extending fins or lugs 34 are secured upon the lower portion of the piston 33 and extend outwardly into sliding engagement with the bore of the conductor. The outer lower corners of the fins 34 are cut away to receive an annular ring 35 which is carried upon a coiled spring 36 encircling the fluted portion of the hammer. The lower end of the spring 36 is carried upon an annular ring 37 supported upon a plurality of lugs 38 extending inwardly from the wall of the conductor 10. The lugs 38 are shown in the drawings as being separate elements set into the wall of the conductor, since this is a much simpler and more economical method of making such a structure.

In this manner, the lugs 38 support the ring 37, the spring 36 and the ring 35, which in turn supports the fins 34, the piston 33 and thereby the hammer 28. The hammer is free to move upwardly and downwardly within the bore of the conductor within the limits set by the adjoining elements of the tool.

The bore 16 is enlarged slightly near the lower end of the conductor 10 to form a downwardly-directed shoulder 39, which receives an annular bevelled ring 40. A pressure-responsive packing ring 41, equal in diameter to the ring 40, is disposed beneath said ring and held in snug engagement therewith by a spacer collar 42 positioned beneath the packing ring. The extreme lower end of the conductor carries internal screw-threads 43 which receive the screw-threaded pin 44 of a retaining collar 45. The upper end of the pin 44 abuts the lower edge of the collar 42 so as to hold the packing ring 41 in position.

A bit carrier 46 is disposed at the lower end of the conductor 10 and is provided with an enlarged head 47 having a tapered, screw-threaded box 48 in its lower end. A tubular shank 49 extends upwardly from the head 47 and is provided with an axial bore 50 which communicates with the box 48. The upper end of the bore is closed to form an anvil 51 upon the extreme upper end of the shank. Radial ports 52 are provided in the side walls of the shank near the upper end thereof to permit the circulation of drilling fluid. A plurality of semicircular grooves 53 extend longitudinally of the shank 49 near its lower end and upon the exterior surface thereof. Complementary grooves 54 are formed internally of the retaining collar 45, and a plurality of splines 55, in the shape of short cylindrical rollers, engage within the complementing grooves 53 and 54 to prevent rotative movement of the bit carrier 46 with respect to the retaining collar 45.

As is shown in Fig. 2 of the drawings, the grooves 53 formed upon the shank 49 are somewhat longer than the splines 55 carried therein, so that the carrier may undergo limited longitudinal movement with respect to the collar 45 and the conductor 10, while being held against rotation with respect thereto. This structure makes provision for protecting the conductor 10 and the tubing string upon which it is supported from the shock of the blow delivered to the anvil 51 by the hammer 28.

A bit 56, which may be of any desirable type, has its screw-threaded pin 57 engaged within the box 48, whereby the bit is rigidly secured to the bit carrier 46. It has been found preferable to use a cable tool type bit which is not subjected to undue wear at its outer corners due to hard formations, and thereby insures the operator of a well bore of uniform diameter. The bit is provided with the usual drilling fluid passages 58 through which the drilling fluid may flow.

The importance of making provision in this tool for using any desirable type of bit, is stressed. Heretofore, the few attempts to provide a percussion drilling mechanism have utilized rock drills, such as star drills, to penentrate the hard formations encountered, and have experienced considerable difficulty in maintaining the diameter of the well bore. In the present invention, this malfunction is eliminated and a well bore of substantially uniform diameter is obtained.

Although a cable tool type bit is suitable and efficient, other types of bits may be utilized within the scope of this invention.

In the operation of this device, the entire assembly is lowered into the well bore upon the usual drilling string (not shown) until the bottom of the hole is reached. A certain amount of weight upon the bit is desirable to cause the splines 55 to ride downwardly within the grooves 53. The lower end of the retaining collar 45 rests upon the enlarged head 47 of the bit carrier to place weight on the bit and protect the splines. Upon starting the mud pump (not shown), drilling fluid or mud is circulated downwardly through the drilling string under pressure, and passes through the bore of the collar 13 and pin 12 into the interior of the control sleeve 24. The drilling fluid may also flow through the ports 15 and slots 25 to insure ample circulation about the spring 21 and within the annular space between the control sleeve and the conductor.

The pressure at the tool, which may be anything from several hundred pounds to a thousand or so pounds per square inch, acts upon the upper end of the piston 33 and also upon the control sleeve 24. Since the spring 21 is not as strong or stiff as the spring 36, the control sleeve is forced downwardly compressing the spring 21. Due to the pressure of the drilling fluid, this downward movement is very rapid and occurs very quickly. The control sleeve travels downwardly until the ring 22 engages the upper end of the sleeve 18, at which time, further downward movement of the sleeve is prevented.

The downward movement of the control sleeve relieves to some extent the pressure of the drilling fluid acting upon the piston 33, and diverts the flow of the fluid therefrom. However, as soon as the sleeve reaches the bottom of its stroke, the full pressure of the drilling fluid as well as the impact resultant from its momentum is directed upon the piston, thereby forcing the piston and hammer downwardly with great rapidity so as to impart considerable velocity and momentum to the hammer. The weight of the entire column of drilling fluid within the tubing string is behind this impact, so that there is no hesitation in the flow of the drilling fluid, the force brought to bear on the hammer being sufficient to eliminate any delay in its downward movement.

As the hammer moves downwardly, the piston is withdrawn from the bore 27. When this occurs, the drilling fluid is permitted to flow through the bore into the lower part of the tool, while the hammer continues its downward travel under momentum until the face 29 strikes the anvil 51 and delivers a blow thereto, which is transmitted through the bit carrier 46 to the bit 56. As soon as this blow is delivered, and the momentum of the hammer is dissipated, the spring 36 is free to return the hammer to its upper position.

The piston is withdrawn from the bore 27 before the hammer strikes the anvil. Otherwise, a fluid lock would occur and the operation of the device be impaired if not terminated altogether. However, the time interval or the distance travelled by the hammer after such withdrawal, is very small, so that the hammer delivers its blow at substantially peak momentum and velocity. By varying the dimensions and hence the spacing of the elements, for example by increasing or decreasing the length of the piston 33, the frequency and magnitude of the blows struck can be controlled.

It is not necessary that the piston have a close fit within the control sleeve. In Fig. 23 is shown a modification of these elements in which the piston 33' is considerably less in diameter than the bore 27', the control sleeve 24' being increased in diameter to maintain the effective area of the piston. With such a modification, a portion of the drilling fluid would flow at all times through the annular space between the piston control sleeve, and a portion of the drilling fluid pressure thus dissipated. Nevertheless, sufficient pressure and volume of drilling fluid would remain to operate the tool effectively.

Nor is it necessary that the control sleeve reach the lower end of its stroke before the hammer starts to move downwardly. As the spring 21 is compressed, the back pressure on the piston increases. The critical value necessary to start downward movement of the hammer may be reached as the sleeve nears the bottom of its stroke, so that when the sleeve reaches its lowermost position, downward movement of the hammer has already commenced.

It can now be seen that when the piston 33 is within the bore 27, the housing 10 is divided into a low pressure chamber below the bore 27 as viewed in Figure 1 and a high pressure chamber above the bore 27 as it is viewed in that figure.

It is pointed out, that as soon as the piston has been withdrawn from the bore 27, the pressure acting upon the control sleeve is relieved through the bore 27 in the annulus and the sleeve is returned to its upper position by the spring 21. As the hammer is returned to its upper position by the spring 36, the piston is moved into the bore 27 and the control sleeve immediately moved downwardly by the pressure of the drilling fluid so that a second cycle is commenced. The design and proportions of the various elements of the tool control, to some extent, the frequency of the impact cycles. Several hundred blows per minute upon the anvil 51 may be obtained, and due to the considerable mass of the hammer, these blows are of large force and power.

It is also pointed out, that as the hammer moves upwardly, the drilling fluid exerts an increasing pressure upon the control sleeve whereby the sleeve may start its downward stroke or travel before the piston and hammer reach their uppermost position. Thus, at this moment the sleeve and the piston would be moving in opposite directions. This function is dependent upon the design and proportions of the various elements. In any event, the sleeve would start its downward travel as soon as the piston enters the bore 27.

In drilling operations, the drilling string may be rotated at the same time that mud is being pumped downwardly through the string, so that the bit 56 is rotated over the surface being drilled, and at the same time, several hundred blows of considerable magnitude are delivered each minute through the lower cutting edge of the bit to the formation. In this manner, very fast and efficient drilling of extremely hard formations is obtained while preserving the other desirable characteristics of rotary drilling.

It is to be noted, that the flow of drilling fluid through the entire tool and out through the ports 58 of the bit 56, is never interrupted so that a continuous lubricating and flushing action is maintained. This worth-while result is obtained by reason of the structure of the piston and control sleeve. As soon as the piston enters the control sleeve on its upward travel, communication through the bore 27 is reduced or minimized; but, the sleeve immediately starts to move downwardly, thereby displacing drilling fluid therebelow. And, as the sleeve nears or reaches the lower end of its stroke, the hammer is moved downwardly displacing additional fluid. This action is very rapid, and by this means fluid continues to move downwardly at all times during the cycle. The frequency of the cycles is sufficiently high to insure very little pulsation of the drilling fluid.

In Figs. 11 through 17 of the drawings, is shown a modification of the invention which operates upon the same principle as the first form described, but has certain of the elements rearranged in different combinations.

In this form of the invention, the control sleeve 24 is replaced with a control plunger or piston, while the piston-type hammer is replaced with a tubular or sleeve-type hammer, said elements to be described hereinafter. The tubular conductor 60, of this modification of the invention, is divided into an upper section 61 and a lower section 62 connected by a screw-threaded joint 63 at their adjacent ends. The upper conductor 61 carries internal screw-threads 64 at its upper end which engage the screw-threaded pin 65 of the collar 66 by which the tool is connected to the usual tubing or drilling string (not shown). The upper section 61 is provided with a longitudinal bore 67 which is reduced in diameter at a point spaced above the lower end of the section to form a shoulder 68 and a reduced bore 69. The extreme lower end of the section 61 is bevelled at 70 for purposes to be set out hereinafter.

A ring 72 is disposed above the shoulder 68 and carries a plurality of radially directed fins or supporting members 73 formed integrally of the ring and extending downwardly therefrom to engage the shoulder 68, whereby the ring is securely held against downward movement with respect to the upper section 61. The axial bore 74 of the ring has its upper portion counterbored at 75 to receive the lower end of a sleeve 76 having a bore 77 substantially equal in diameter to the bore 74 of said ring. The sleeve 76 is provided at its upper end with a plurality of radially-extending fins or lugs 78 which engage beneath the pin 65 of the collar 66 to secure the sleeve and the ring 72 against upward movement. A pair of diametrically opposed, longitudinal slots 79 extend throughout the upper portion of the sleeve.

A cylindrical control piston 80 has a sliding fit within the sleeve 76 and is greater in length than the sleeve, the lower end of the piston being enlarged to form a head 81 which extends below the ring 72 and engages therebeneath. A transverse slot 82 is formed near the upper end of the piston 80 and receives a cotter 83 which extends through the slots 79 of the sleeve 76. The lower sides of the projecting ends of the cotter are cut away to receive an annular ring 84 which encircles the sleeve 76 and engages within the cut-away portions to prevent displacement of the cotter from the slot 82. A coiled spring 85 is compressed between the ring 72 and the ring 84 so as to urge the cotter 83 and the piston 80 upwardly at all times.

A tubular hammer 86 having an axial bore 87, has a sliding fit within the bore 69 and extends therebelow within the bore 88 of the lower conductor section 62. The upper portion 89 of the bore 87 is enlarged slightly in diameter so as to have a snug sliding fit with the head 81 of the piston 80, said enlarged portion extending downwardly a distance substantially equal to the length of the slots 79. The hammer is provided at spaced intervals throughout its length with a plurality of radially extending external fins or lugs 90 which serve to center the hammer within the bore 88 of the lower section of the conductor and to guide the hammer in its travel therethrough. A plurality of spaced, radial ports 86' cut in the lower portion of the wall of the hammer allow proper circulation of the drilling fluid and prevent the fluid from cushioning the hammer blows.

Internal screw-threads 91 are formed at the extreme lower end of the lower conductor section to receive the screw-threaded pin 91 of a retaining collar 92 similar in all respects to the collar 45 shown in the first form of the invention. A spacer collar 93, similar to the collar 42, is disposed upon the upper end of the pin 91 and carries an annular, pressure-responsive packing ring 94 upon which rests a packing retaining sleeve 95. The sleeve 95 has a snug fit within the bore 88 and is formed with a bevelled inwardly-directed flange 96 at its lower end, said flange serving to retain the packing ring 94 in position. The sleeve extends upwardly to a point spaced slightly above the lower end of the hammer 86 when said hammer is in its upper position, and a plurality of inwardly-directed fins or lugs 97 are provided upon the upper end of the sleeve. The hammer has a sliding fit within said lugs, and a coiled spring 98 is compressed between the lugs 97 and the lugs 96 carried by the hammer, so that the spring constantly tends to urge the hammer upwardly. The upward movement of the hammer is limited by engagement of the lugs 90 with the lower end of the upper section 61.

A bit holder (not shown) is positioned in the lower end of this modification of the tool, and is provided with an upwardly-extending shank 99 having an axial bore 100. The shank 99 is splined to the retaining collar 92 by means of cylindrical roller splines 101 similar to the splines 55 described in the first form of the invention. The axial bore 100 extends throughout the length of the shank 99, and the upper periphery of said shank is adapted to act as an anvil to receive impact blows delivered through the lower periphery of the hammer.

The operation of this modified form is substantially the same as that set out in connection with the description of the first form of the invention. Drilling fluid under pressure acting downwardly through the collar 66 acts upon the control piston 80 to force it downwardly against the compressive force of the spring 85. The downward travel of the control piston is limited by engagement of the cotter with the bottoms of the slots 79. As the control piston nears or reaches the lower end of its stroke, the pressure of the drilling fluid acts upon the upper end of the hammer to drive it downwardly under considerable velocity. Due to the heavy-walled construction of the hammer, great momentum is thereby acquired to deliver a heavy blow. As the hammer moves downwardly the engagement of the head 81 within the enlarged bore 89 of the hammer is terminated and the drilling fluid free to flow around the lugs 73 and below the ring 74 to enter into the axial bore of the hammer. When this separation occurs, the control piston is free to be returned to its upper position by the spring 76 while the hammer continues downwardly under momentum to deliver a blow to the upper end of the shank 99 of the bit holder, which blow is communicated directly to the cutting edges of the bit (not shown). This bit is similar in all respects to that shown in the first form of the invention, and may be rotated through the splines 101 while percussion blows are being struck so as to effect a combination percussion and rotary drilling action.

As soon as the hammer has delivered its blow, the spring 98 returns it to its upper position, the bevel 70 facilitating the entry of the hammer into the bore 69 wherein the head 81 of the control piston 80 again engages within the upper portion 89 of the bore of the hammer, to trap the drilling fluid and commence the downward movement of the control piston. The cycle thus repeats itself indefinitely until such time as pumping of the drilling fluid is stopped.

In Figs. 18, 20 and 21 of the drawings, is shown a jar constructed in accordance with the principles of this invention. Such a tool has a wide variety of uses, being employed extensively in fishing operations wherein it is desired to impart to the tubing string a series of upward blows in order to dislodge a length of tubing or various oil well tools which may become stuck within the well bore. The tool is adapted to be used in connection with a variety of fishing tools which engage the stuck objects in various manners, and usually require a series of upward blows to loosen or free the stuck object, or it may be used in any other instance wherein it is desirable to employ a jar.

In this form of the invention, an upper conductor section 110, similar to the upper section 61 of the modified form of the invention shown in Fig. 11 of the drawings, is utilized, and a lower section 111, similar to the lower section 62 is provided. Internal screw-threads 112 are provided in the upper end of the lower section, which engage a screw-threaded pin 113 formed on the lower end of the upper section 110. A piston 114 is carried upon a coiled spring 115 within the upper section 110 in the same manner that the control piston 80 is carried within the upper section 62. The piston 114 is similar in all respects to the piston 80 with the exception that the lower end of the piston 114 is not enlarged to form a head, but has a continuous external surface. The lower edge of the piston is rounded to facilitate its engagement within the hammer to be described hereinafter.

The lower portion 117 of the wall of the upper conductor section 110 is increased in thickness to provide a reduced axial bore 118 within which the control piston reciprocates, and a plurality of longitudinal grooves 119, square in cross-section, are formed in the wall of the bore 118 to permit circulation of drilling fluid therethrough.

The thickened wall section in the lower end of the upper section 110 provides an anvil adapted to be struck by a heavy cylindrical hammer 120 which has a sliding fit within the lower conductor section 111. The hammer is formed with an axial bore 121 extending throughout its length and in which the control piston 114 has a sliding fit. The outside diameter of the hammer is reduced in the lower portion of the hammer to form a tubular shank 122 and an external annular, downwardly-directed shoulder 123. A plurality of radial ports 124 are formed in the wall of the shank 122 to permit circulation of the drilling fluid.

Internal screw-threads 125 are provided upon the extreme lower end of the lower conductor section 111 and receive the screw-threaded pin 126 of a retaining collar 127. Enlarged, internal, screw-threads 128 are provided within the collar 127 and engage similar threads 129 formed on the upstanding pin 130 of a coupling collar 131. The collar carries the usual screw-threaded pin 132 on its lower end, and is provided with an upstanding tubular sleeve 133 extending above the screw-threaded pin 130. The lower end of the shank 122 of the hammer telescopes the upper end of the sleeve 133, and a coiled spring 134 is compressed between the upper end of the sleeve and the shoulder 123 formed on the hammer. A suitable split safety ring 135 is positioned within an external annular groove 136 formed at the upper end of the sleeve, so as to prevent complete disconnection of the coupling collar 131 from the retaining collar 127 when the threads 128 and 129 are disengaged. The ring 135 may be formed of any suitable frangible or shearable material so that it may be sheared to release the tool in the event the stuck object and the fishing tool cannot be freed. Also, an internal, annular groove 137 is provided in the bore of the retaining collar 127 above the screw-threads 128 and receives an annular packing ring 138 to pack off the joint between the retaining collar and the sleeve 133.

In the operation of this modification of the invention, the tool described is connected into the fishing string above the fishing tool, and may be located at any desirable point within said string. Upon circulation of drilling fluid through the string, the control piston 114 is forced downwardly by the pressure of this fluid, compressing the spring 115. The downward travel of the control piston is limited by a cotter, structurally corresponding to the cotter 82 shown in Fig. 11, so that the pressure of the drilling fluid forces the hammer downwardly under momentum. As the hammer separates from the control piston, the piston is returned to its upper position by the spring 115 and the hammer continues downwardly until its momentum is absorbed by the spring 134, which is thereby placed under considerable compression. This compressive force is released from the spring by the rapid return of the hammer to its upper or impact position. The spring forces the hammer upwardly with considerable momentum against the lower end of the pin 113, and delivers a blow of considerable force and power to said pin, the blow being transmitted through the lower section 111, the retaining collar 127 and the coupling 131 to the tubing and/or fishing tool or other appliance below this percussion tool.

Here again the hammer 120 and the piston 114 when engaged subdivide the interior of the casing into a high pressure chamber above the valve and a low pressure chamber below it.

Thus, the drilling fluid serves to compress and store energy in the spring 134, which, when released, drives the hammer upwardly into violent impact with the lower end of the pin 113, which impact is transmitted to the fishing tool. The tool may be designed to deliver a relatively high frequency of impact blows, as many as several hundred per minute, and the force and frequency of these blows may be further controlled by means of the enlarged screw threads 128 and 129.

These threads, being of relatively coarse design, may be partially disengaged with considerably less torsional force than the normal threaded connections in a tubing or fishing string. The tubing may thus be rotated from the well head to rotate the lower conductor section 111. The tubing below this percussion tool is held against rotation by the fishing tool, so that the collar 131 is held. The rotation of the tubing in the well head therefore results in a breaking of the joint between the pin 130 and the retaining collar 127. This operation moves the sleeve 126 along with the spring 134 downwardly with respect to the upper section 110 and the control piston 114, and allows the hammer to move downwardly with respect to the control piston due to its own weight. When the hammer is in its upper position, the spring 134 is in its fully expanded position, taking the weight of the hammer into consideration, so that such separation allows the hammer to move downwardly as described. The moving apart of the control piston and hammer causes complete disengagement of these two elements earlier in the impact cycle so that blows of less force are delivered to the pin or anvil 113. Continued rotation of the tubing will completely separate the hammer and control piston, so that circulation of the drilling fluid is established between or through the space between the two elements, and the tool is rendered inoperative. Thus, the operator may establish circulation of the drilling fluid to the fishing tool, or to a point below this percussion tool, without causing the tool to operate and deliver impact blows. When desired, rotation of the tubing may be reversed to again bring the control piston into engagement with the hammer and resume operation of the tool. It is pointed out, that the jar is normally run into the well in this inoperative position so as to prevent the necessity of displacing fluid in the well bore. After positioning the tubing may be rotated to bring the jar into operation.

In Figs. 19 and 22, is shown a modification of this jar in which a control sleeve 140, similar to the control sleeve 24 described in connection with the first form of the invention, is utilized. The upper conductor 141 is constructed similarly to the section 110 shown in Fig. 18, with the exception that the bore 142 replaces the bore 118 and the grooves 119, and is of sufficient diameter to receive the control sleeve 140. A tubular, heavy walled hammer 143 is slidable within the lower conductor housing 144, the bore 145 of the hammer being closed at its upper end by an upstanding reduced piston 146 which is adapted to be engaged by the control sleeve 140. A plurality of ports 147 communicate between the bore 145 of the hammer and the space at the base of the piston 146, so that circulation of the drilling fluid downwardly through the hammer may take place. A screw-threaded pin 148 is provided at the lower end of the upper conductor section 141 to form an anvil adapted to be struck by the upper end of the hammer as the piston 146 telescopes the bore 142 and control sleeve 140.

The operation of this last form of the invention is the same as that described in connection with the immediately preceding form. The hammer and control sleeve are forced downwardly in rotation by the drilling fluid until disengagement of the two elements occurs. The hammer continues to travel downwardly until the energy of its momentum is absorbed by the spring, at which time energy thus stored in the spring is released to force the hammer upward rapidly, causing it to strike the pin or anvil 148 under considerable momentum and thereby deliver a blow of sizeable magnitude.

In each of the modifications described, the same provisions apply as for the first form disclosed. It is not necessary for the pistons and sleeves to fit closely, and, if desired, considerable clearance may be provided between the two, as shown in Fig. 23. It is important that the two elements separate before the hammer blow is struck, and to obtain maximum power it is desirable that the blow be struck immediately after separation. However, the hammer may travel greater distances before impact, the loss in power being proportional to the delay after separation and before impact.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A well percussion tool that comprises a tubular housing means having an axially directed opening therein dividing the interior of said housing into an upper high pressure chamber and a low pressure chamber below the high pressure chamber, an opening into the high pressure chamber for the supply of high pressure fluid thereto, an opening from the low pressure chamber for the exhaust of fluid therefrom, two elements mounted for axial reciprocation within said housing, one of said elements having the form of a sleeve fitting slidably in the opening in the means dividing the housing into upper and lower chambers, the other of said elements having the form of a piston fitting slidably in said sleeve; elastic means for urging one of said elements toward the high pressure chamber, means to urge the other member toward the high pressure chamber, said elastic urging means and said other urging means causing said elements to engage to close the opening between the chambers so that a pressure differential may be established to force the elements in the other direction; a hammer attached to one of the elements; and an anvil mounted on said housing below said elements and serving to stop the movement of said hammer and the element attached to it in a direction away from said high pressure chamber, after said element having the hammer attached thereto has passed out of engagement with the other element thus releasing the pressure differential between the chambers and allowing the other element to move back toward said high pressure chamber.

2. A well percussion tool comprising a tubular housing, sliding sleeve and piston elements reciprocally mounted in said housing for individual movement in the same direction from a telescoping position dividing the housing into a high pressure chamber and a low pressure chamber to a mutally separated position in which communication is established between said chambers, said housing having a drilling mud inlet to said high pressure chamber and a mud outlet from said low pressure chamber, an elastic means biasing one of said elements toward said inlet, means biasing the other of said elements toward said inlet, both of said elements having surfaces exposed to the pressure of said high pressure chamber, the area of said surfaces being correlated with the thrust of the biasing means so that the element which effects the separating stroke moves in response to a higher pressure than the other element, and impact receiving means in the path of movement of the element which effects the separating stroke between its separation from the other element and the re-establishment of telescoping relation thereto.

3. A well percussion tool comprising a tubular housing, sliding sleeve and piston elements reciprocally mounted in said housing for movement in the same direction from an upper telescoping position dividing the housing into a high pressure chamber and a low pressure chamber to a lower position in which the piston is withdrawn from the lower end of the sleeve, said housing having a drilling mud inlet to said high pressure chamber and a mud outlet from said low pressure chamber, a high thrust spring biasing said piston toward said inlet, a low thrust spring biasing said sleeve toward said inlet, said sleeve and piston each having a surface exposed to the pressure of the high pressure chamber, the area of said surfaces in relation to the thrust of the respective springs being such as to cause the sleeve to move in response to a lower pressure than the piston and impact receiving means in the path of reciprocation of the piston between the egress thereof from the lower end of the sleeve and the re-entry thereof into said sleeve to which the piston element imparts a blow.

4. A well percussion tool comprising a tubular housing, sliding sleeve and piston elements reciprocally mounted in said housing for individual movement in the same direction from an upper telescoping position dividing the housing into a high pressure chamber and a low pressure chamber to a lower position in which the sleeve is withdrawn from around the lower end of the piston, said housing having a drilling mud inlet to said high pressure chamber and a mud outlet from said low pressure chamber, a high thrust spring biasing said sleeve toward said inlet, a low thrust spring biasing said piston toward said inlet, said sleeve and piston each having a surface exposed to the pressure of the high pressure chamber, the arrangement of said surfaces in relation to the thrust of the respective springs being such as to cause the piston to move in response to a lower pressure than the sleeve, and impact receiving means in the path of reciprocation of the sleeve element between the separation thereof from the lower end of the piston and the return thereof into piston-surrounding position to which the sleeve element imparts a blow.

5. A well percussion tool as claimed in claim 2 wherein the impact receiving means is an anvil connected to the casing near the lower end thereof and in which the mud outlet from the lower pressure chamber includes a passageway through the anvil.

6. A well percussion tool as claimed in claim 3 in which the sleeve is provided with longitudinally extending ports therethrough for a portion of its length, the low thrust spring surrounds the sleeve and means are provided for dividing the mud flow entering the inlet into a portion surrounding the sleeve and a portion within the sleeve.

7. A well percussion tool as claimed in claim 2 wherein the impact receiving means is an internally projecting shoulder constituting a part of the housing and acting to receive the stroke of the element effecting the separation in its movement toward the mud inlet.

ROSS BASSINGER.

REFERENCES CITED

The following references are of record in the file of this patent:

UNITED STATES PATENTS

| Number | Name | Date |
|---|---|---|
| 1,076,469 | Travers | Oct. 21, 1913 |
| 1,861,042 | Zublin | May 31, 1932 |
| 2,245,786 | Johnson | June 17, 1941 |
| 2,344,725 | Phipps | Mar. 21, 1944 |